Aug. 14, 1956  W. F. WARD ET AL  2,758,838
COMBINATION UNDERFEED AND LAP STACKER
Filed Oct. 11, 1952  10 Sheets-Sheet 5

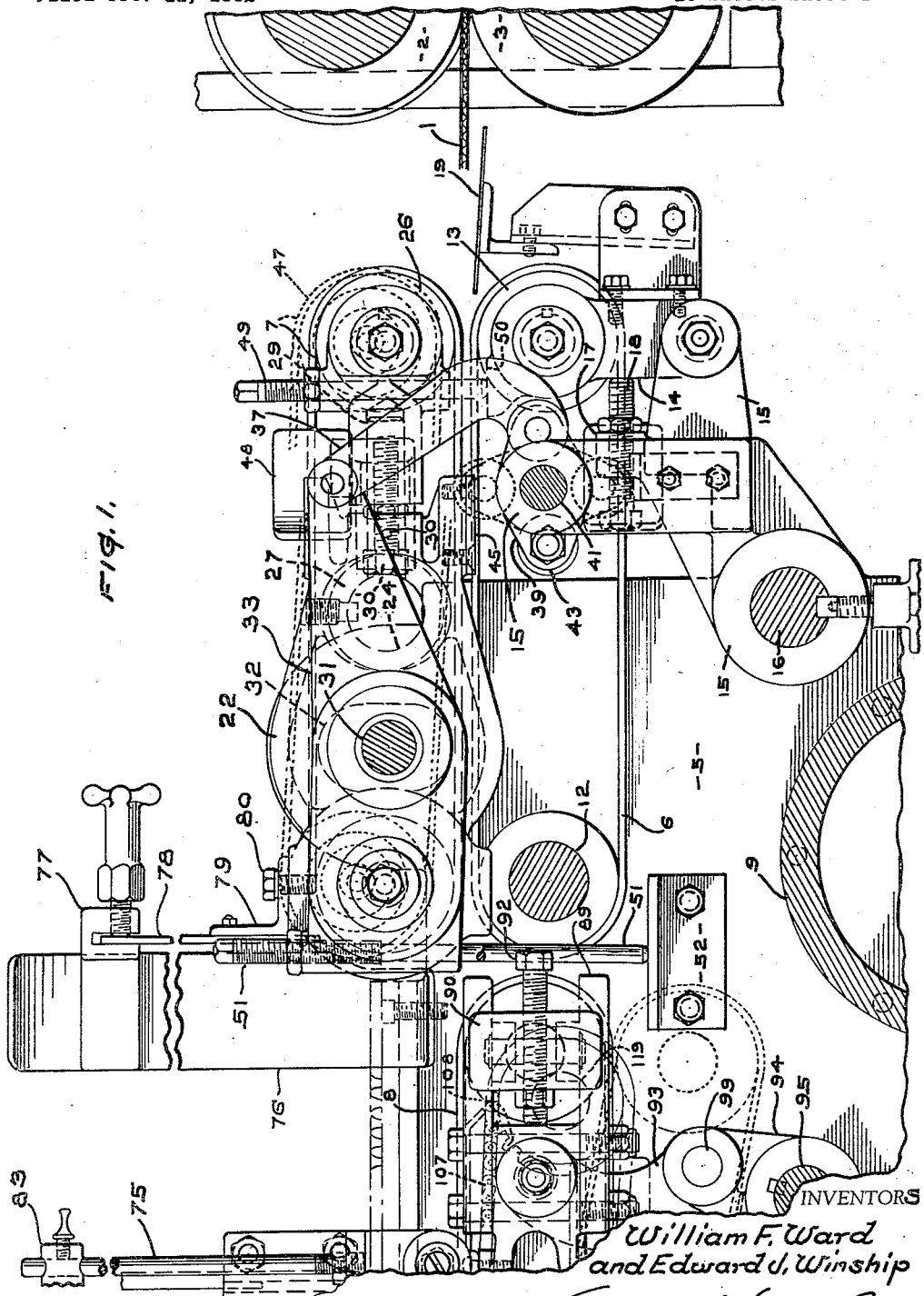

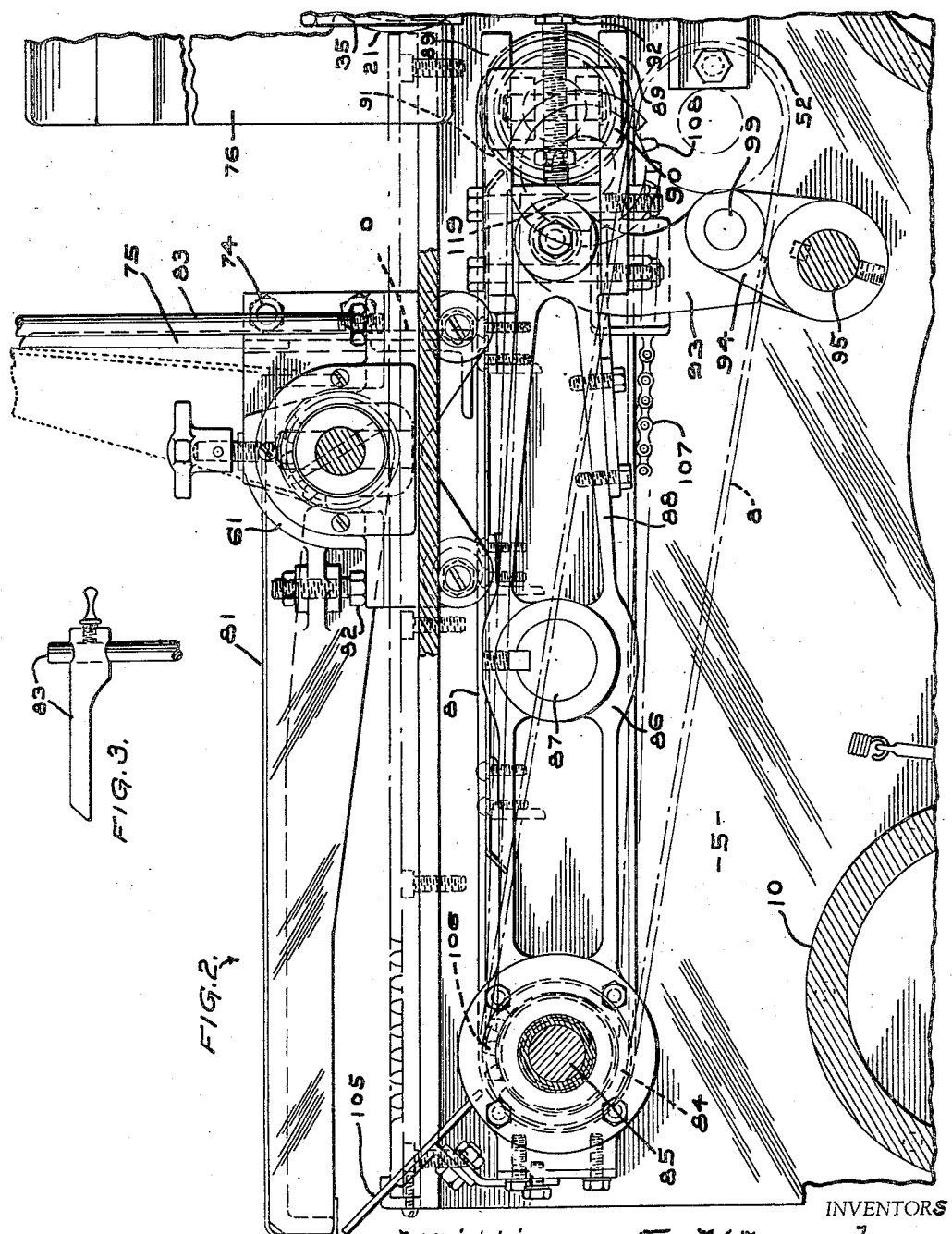

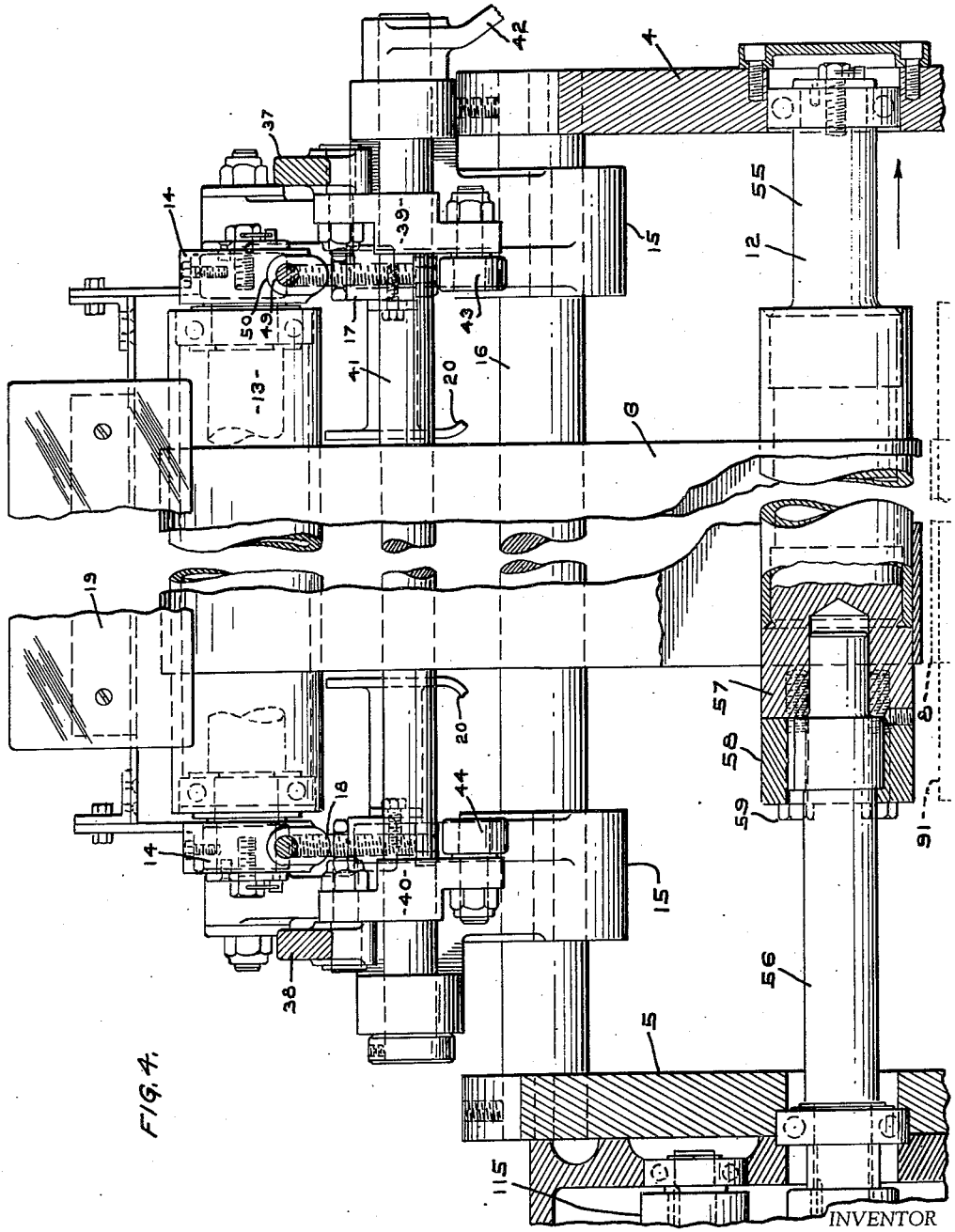

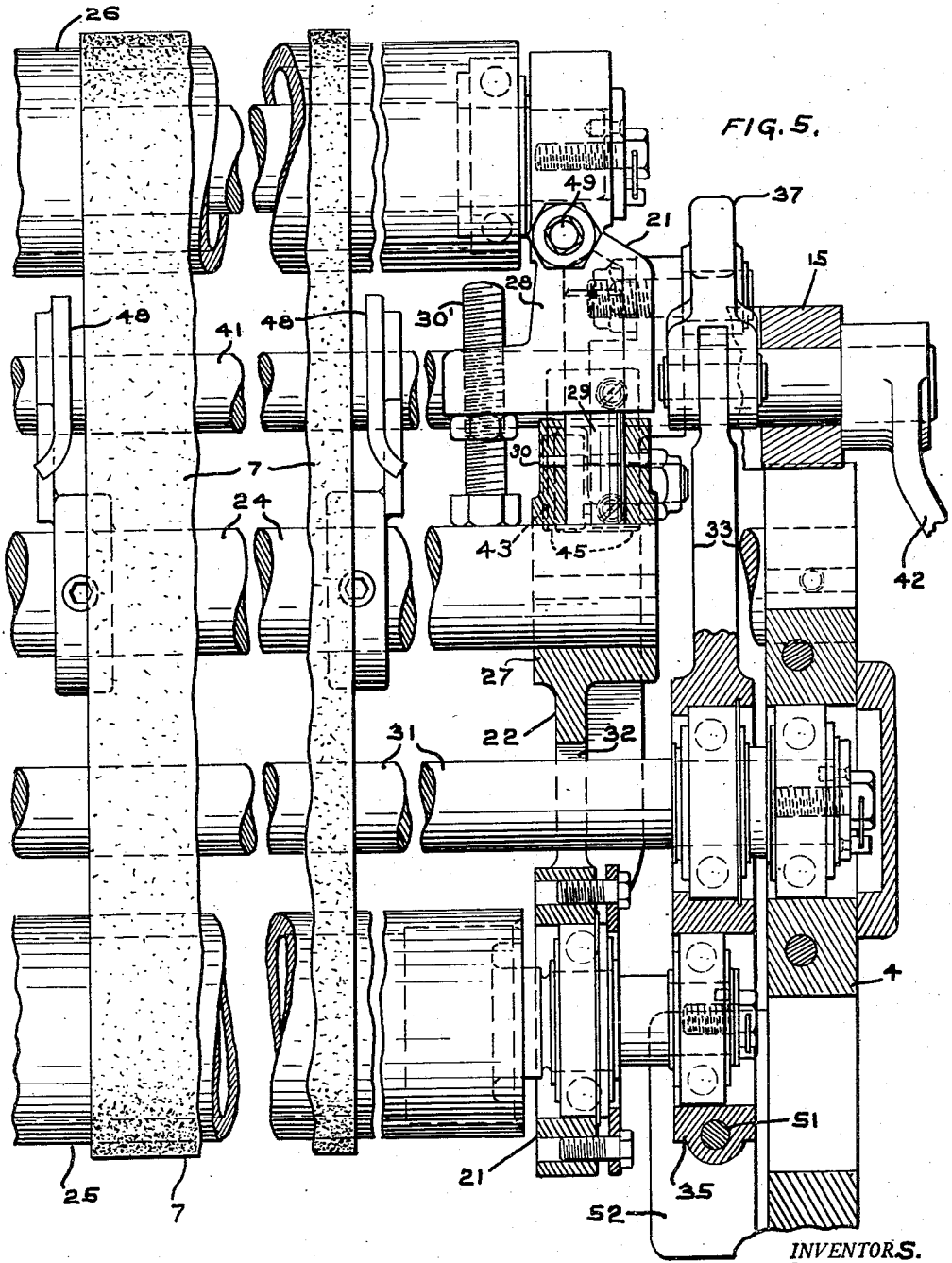

INVENTORS.
William F. Ward
and Edward J. Winship.
By Thomas W. J. Clark
Attorney Aug. 14, 1956 W. F. WARD ET AL 2,758,838
COMBINATION UNDERFEED AND LAP STACKER
Filed Oct. 11, 1952. 10 Sheets-Sheet 6

INVENTORS
William F. Ward and
Edward J. Winship
BY
ATTORNEY

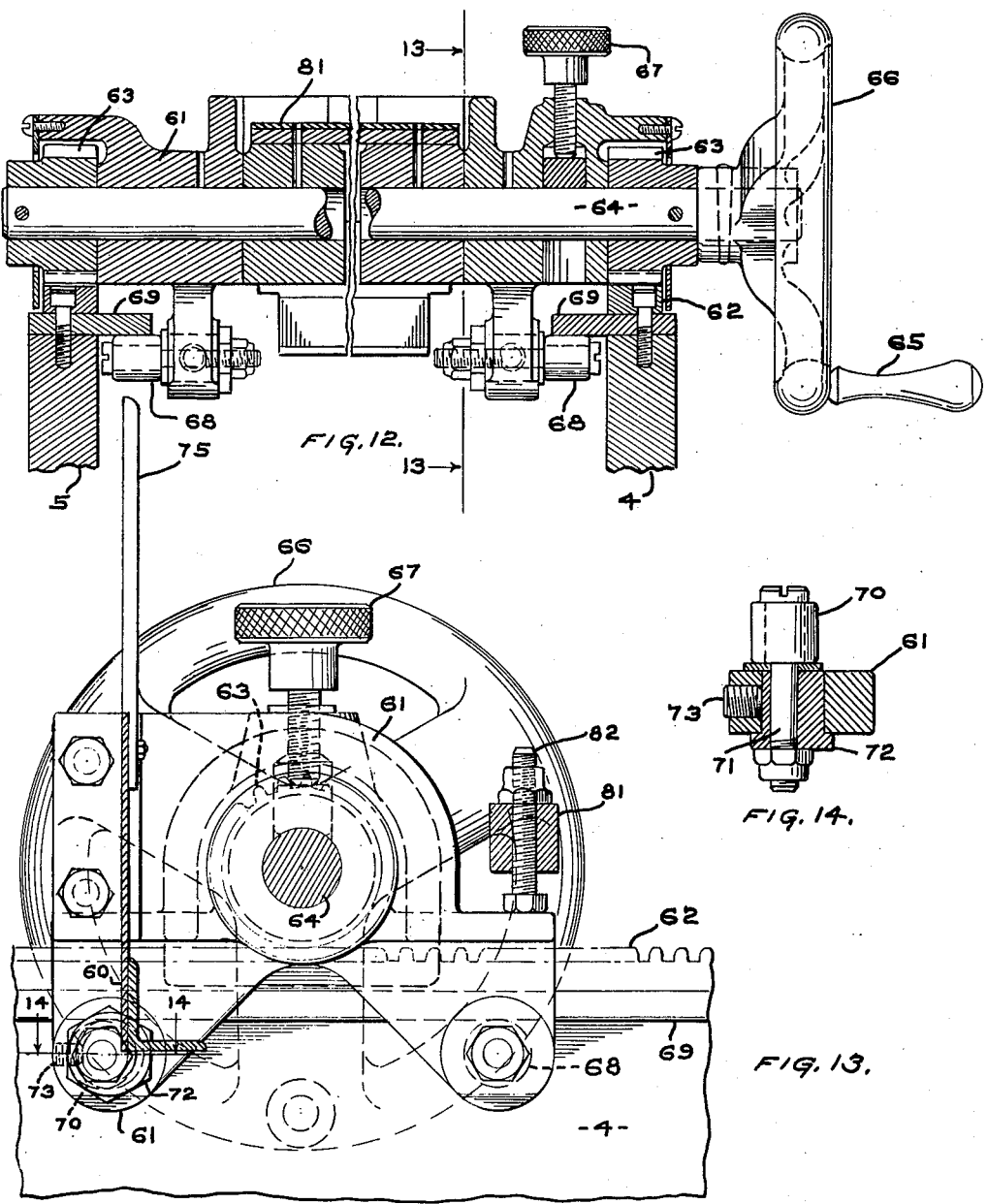

Aug. 14, 1956  W. F. WARD ET AL  2,758,838
COMBINATION UNDERFEED AND LAP STACKER
Filed Oct. 11, 1952  10 Sheets-Sheet 8
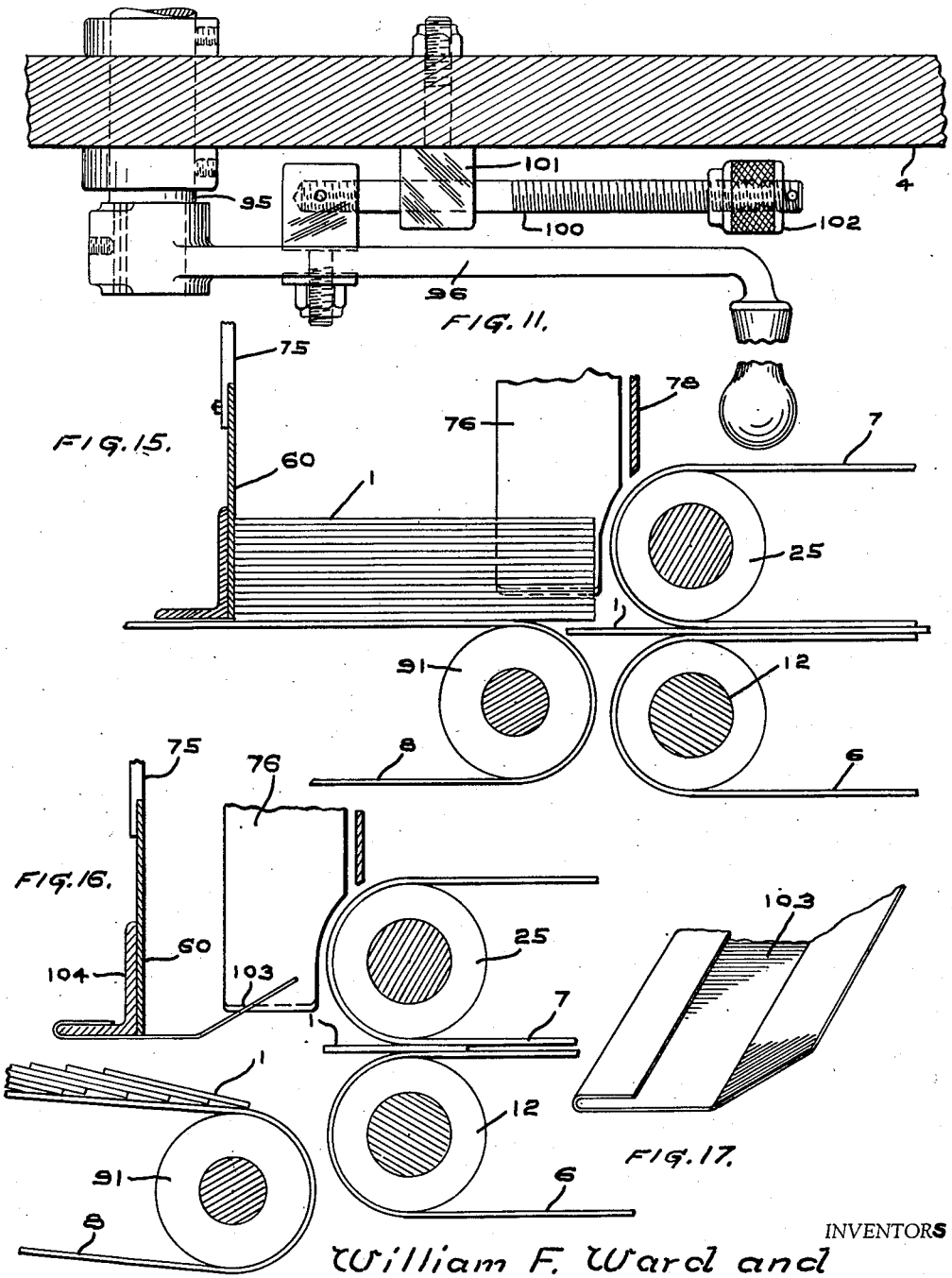
INVENTORS
William F. Ward and
Edward J. Winship
BY Thomas W. Clark
ATTORNEY Aug. 14, 1956  W. F. WARD ET AL  2,758,838
COMBINATION UNDERFEED AND LAP STACKER
Filed Oct. 11, 1952  10 Sheets-Sheet 9

INVENTOR.
William F. Ward and
Edward J. Winship
By Thomas W. Clark
Attorney

Aug. 14, 1956  W. F. WARD ET AL  2,758,838
COMBINATION UNDERFEED AND LAP STACKER
Filed Oct. 11, 1952  10 Sheets-Sheet 10

INVENTOR
William F. Ward and
Edward J. Winship
BY Thomas W. J. Clark
ATTORNEY

United States Patent Office 2,758,838
Patented Aug. 14, 1956

2,758,838

COMBINATION UNDERFEED AND LAP STACKER

William F. Ward and Edward J. Winship, Baltimore County, Md., assignors, by mesne assignments, to Koppers Company, Inc., Pittsburgh, Pa., a corporation of Delaware Application October 11, 1952, Serial No. 314,372

11 Claims. (Cl. 271—76)

This invention relates to a combination underfeed and lap stacker for box blanks.

Heretofore in receiving blanks from a printer slotter and creaser, wide boards, wide in the direction of sheet travel, have preferably been stacked in vertical piles. Sheets which are relatively narrow in width, however, are difficult to stack vertically by the underfeed method and the practice has been followed of moving from the slotting machine the underfeed stacker which is generally used and to wheel up to the slotting machine a slow moving belt delivery, the belt of which goes so much slower than the delivery of sheets to it, that the sheets overlap. By proper adjustment of the speed between the lap stacker and the slotting machine, the sheets may be made to stand up on end, very nearly vertically, and they may be removed from this slow moving belt delivery in groups for further handling. It is sometimes desirable also to use the slow moving belt delivery to receive blanks to which adhesive or ink has been applied and to give the adhesive or ink time to dry. In this case the relative speeds of the delivering belt and feed belts are so adjusted as to allow the adhesive or printed portion of the blanks to remain exposed, without contact with the following blanks.

It is the object of this invention to provide a unitary machine which by very rapid changes can be adjusted to serve either function, to serve as an underfeed stacker in one position of the delivery belt and to serve as a lap stacker in another position and speed for the delivery belt. With this invention only one machine need be employed adjacent the slotting machine and it need only be removed from the slotting machine when adjustments of that machine are required. It will always be adaptable to receive the blanks produced from the slotting machine, regardless of their width.

It is preferable to drive the combination underfeed and lap stacker with a separate variable speed motor or a motor with a Reeves drive between the motor and the conveyors and the motor is preferably driven from a syncro-tie transmitter from the slotting machine so that the speed of the motor will respond to the speed of the slotting machine, after the Reeves drive has been adjusted to drive the feed belts of the underfeed and lap stacker at the same speed as the delivery of blanks by the slotting machine.

It is a further object of the invention to make the underfeed stacker adjustable for the width of the blanks to be delivered to it and to make the pile of blanks readily accessible for removal from the stacker.

Another object of the invention is to make the lap stacker delivery belt tiltable, and so variable in speed in relation to the speed of the feed belts, that the blanks delivered to the delivery belt will stand at such vertical angle as may be desired, or will overlap to such degree as desired. These variations will be accomplished by changing the angle of the delivery belt with respect to the horizontal and by changing its relative speed with respect to the speed of the feed belts, it being understood that the speed of the feed belts is always synchronously tied in with the speed of the slotting machine delivery.

Another object of the invention is to make the feed belts readily separable so that in case blanks jam or fold between them, that they may be opened and the rumpled blanks quickly removed.

Other objects and advantages of the invention will be apparent from the following description and the accompanying drawings forming a part hereof and in which:

Figure 1 is a transverse vertical sectional view of the feed end of the machine from the operator's side and with the side frame removed.

Figure 2 is a continuation to the left of the machine as shown in Figure 1 with certain elements at the center of the machine being duplicated.

Figure 3 is a side elevation of the gage at the top of one of the backstop rods.

Figure 4 is a plan view partly in section and partly broken away of the lower feed belt.

Figure 5 is a similar view of the upper feed belt on the operator's side.

Figure 11 is a top plan view of this lever mechanism.

Figure 12 is a transverse vertical sectional view of the backstop carriage.

Figure 13 is a vertical sectional view on line 13—13 of Figure 12.

Figure 14 is a horizontal sectional view on line 14—14 of Figure 13.

Figure 15 is a longitudinal vertical sectional view of the feed and delivery belts showing their cooperation as an underfeed stacker.

Figure 16 is a longitudinal vertical sectional view with the feed and delivery belts adjusted as a lap stacker.

Figure 17 is a perspective view of the deflector attached to the backstop when the machine is used as a lap stacker.

In the drawing similar numerals refer to similar parts throughout the several views.

Figure 6:
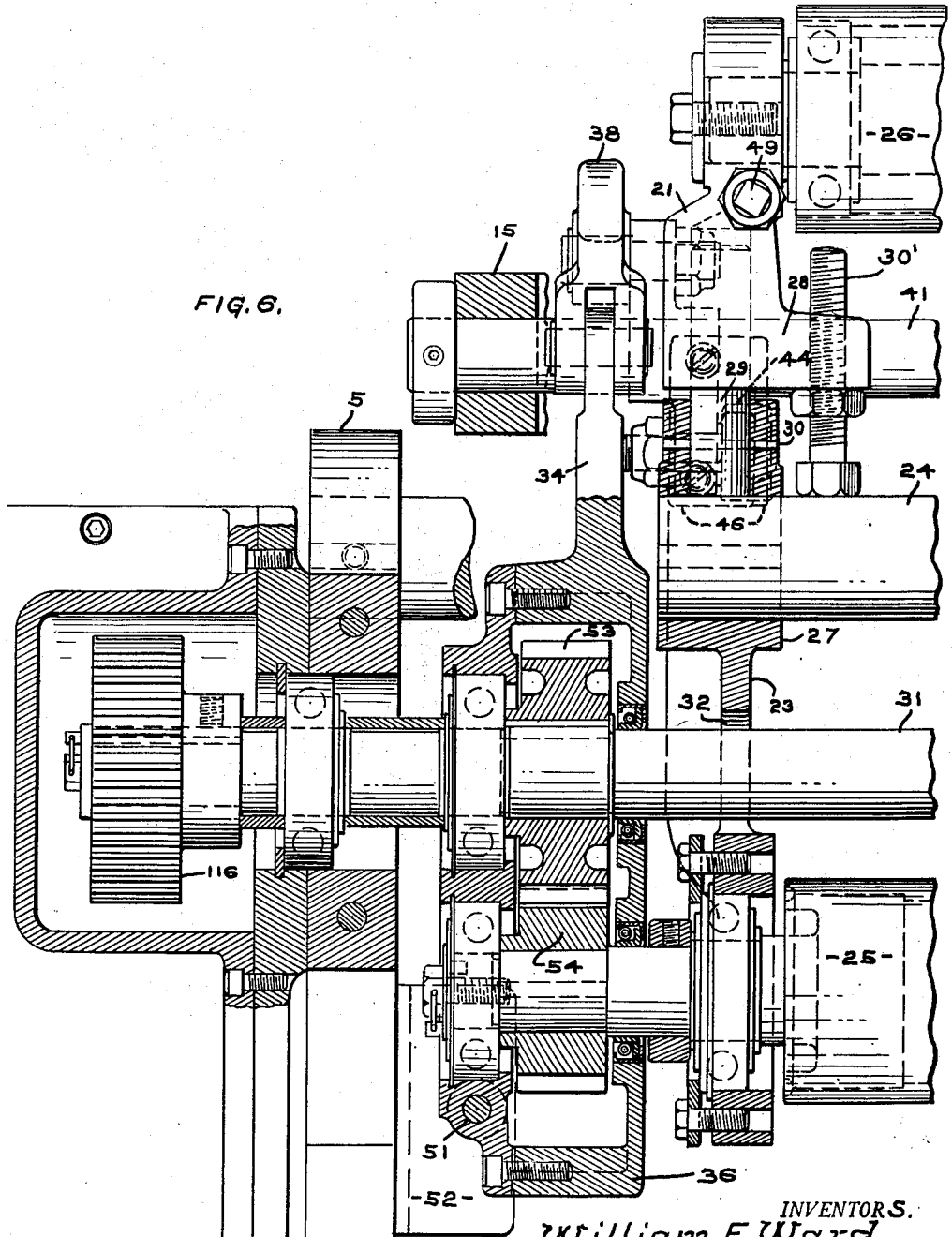
Figure 6 is a continuation to the left of the upper feed belt shown in Figure 4 to the driving side of the machine.

The blank 1 is shown in Figure 1 as being delivered from the delivery rolls 2 and 3 of the slotting machine. The stacker has side frames 4 and 5 having therein lower feed belt 6 and upper feed belt 7 which receive the blanks therebetween in spaced out relation and pass them to the delivery belt 8. The side frames 4 and 5 are connected by spacing tubes 9 and 10 and the frame may be mounted on rollers one of which is shown at 11.

The lower feed belt is mounted on a shaft 12 at its delivery end, the shaft rotating in the side frames of the machine and serving as the main drive shaft for the machine. The other end of the lower feed belt is mounted on a roller 13 held in pivoted arms 14 at either end which are pivoted in brackets 15 supported by shaft 16 which in turn is held in the side frames 4 and 5 of the machine. Brackets 15 also have projecting portions 17 receiving belt tightening screws 18 which bear against the pivoted arms 14 to maintain the belt 6 tight. Also attached to the pivoted arms 14 is the bed 19 for receiving narrow blanks from the slotting machine, and passing them to the stacker feed belts. Belt guides 20 are likewise attached to brackets 15.

The top or upper feed belt 7 is mounted in a floating frame 21 having side members 22 and 23 joined by connecting shaft 24. The belt 7 is mounted on driven roller 25 at its delivery end and idler roller 26 at its receiving end, both these rollers being mounted in this floating frame 21. The floating frame 21 is divided into two sections 27 and 28 connected together by rods 29. These rods 29 are held in sections 27 by pins 30 and the sections 28 slide loosely on the rods. Sections 28 carry the belt roller 26 and in order to tighten that belt, the sections 28 may be pushed outwardly by means of screws 30' bearing against the connecting shaft 24.

A drive shaft 31 is mounted in bearings in the side frames 4 and 5 and it passes through vertical openings 32 in the side frames 22 and 23 of the floating frame 21. Levers 33 and 34 are pivoted on this drive shaft 31 and at their free ends 35 and 36 they carry driven belt roller 25. Levers 33 and 34 at their adjusting ends are connected to adjusting arms 37 and 38. These arms are at their other end connected to one end of the rotating levers 39 and 40 mounted on shaft 41 rotatably mounted in brackets 15 and the shaft is rotated by handle 42. When lever 42 is turned to lower arms 37 and 38 it will be apparent that roller 25 rises, frame 21 pivoting about shaft 31. Rotating levers 39 and 40 have on their other ends rollers 43 and 44 which bear on pads 45 and 46 on the underside of the extreme end of sections 27 of the floating frame 21 when the rotating levers 39 and 40 are turned in their extreme vertical position as shown in dotted lines of Figure 1. In this position the rollers 43 and 44 elevate the receiving end of the upper feed roll 7 so that it takes the position shown by the dotted lines at 47 in Figure 1. Belt guides 48 for the upper feed belt are attached to the connecting shaft 24 as shown in Figure 5. Set screws 49 at the receiving end of the upper feed belt bear on seats 50 projecting from pivoted arms 14 supporting the lower feed belt roller 13. Set screws 51 bear on side plates 52 connected to the frame members 4 and 5. These two pairs of set screws are adjusted to limit the downward movement of the upper feed belt 7 as it is mounted in its frame 21.

The drive shaft 31 has thereon gear 53 driving gear 54 on the shaft of roller 25 of upper feed belt 7, thereby driving the belt regardless of its vertical position.

The main drive shaft 12 is divided into two parts 55 and 56 and the tube of the roller which carries the belt 6 is rigidly attached to the portion 55 at one end. At the other end the tube of the roller has a core 57 with a center drilled portion fitting over portion 56 and held thereon by means of fixed collar 58 on portion 56 by means of bolts 59. When it is desired to remove the belt 6 from this roller 12 the bolts are released from the core 57, and the bearings on the portion 55 are pushed from the frame 4 and portion 55 is pushed through the bearing opening to leave a space between the tube of roller 12 and the portion 56 so that the belt may be removed through that space and replaced, after which the roller may be reassembled for driving.

The blanks pass between the feed belts 6 and 7 to the delivery belt 8. When the delivery belt is in its horizontal position and serving as an underfeed stacker, its leading end will be slightly above the delivery end of the feed belts so that as the blanks approach the delivery belt their leading edge will be pulled upwardly by the delivery belt and as that belt proceeds, the blanks will be led forwardly. In this forward movement they are stopped by backstop 60 mounted on carriage 61 which slides on racks 62 mounted on the top edges of the side frames 4 and 5. The carriage 61 is moved along these racks by means of pinions 63 on shaft 64 turned by handle 65 on handwheel 66. The carriage is held in its adjusted position by means of set screw 67. It is most important that the backstop be kept in close rolling contact on its racks and for that purpose it has on the trailing end of its underside rollers 68 which bear against runways 69 between the side frames 4 and 5 and the racks 62. Similar rollers 70 hold down the leading end of the carriage on these ways 69 and these rollers 70 are mounted on pintles 71 in eccentric bearings 72 whose positions in the carriage 61 are fixed by set screws 73. By adjustment of the eccentric bearings 72 the carriage 61 may be closely aligned on the racks on top of the side frames 4 and 5. The backstop 60 is adjusted vertically on the carriage 61 by means of bolts 74. Above the carriage the backstop comprises a plurality of spaced fingers 75 so that an operator may reach between them to lift out a pile of blanks. Side guides 76 having brackets 77 thereon are mounted on forward stop 78 attached to angle 79 held by screws 80 on floating frame 21. The vertical piling of blanks by the machine as above described is illustrated in Figure 15.

Pivoted on the shaft 64 of the carriage 61 and moving longitudinally of the frame with the carriage is backstop table 81 which may be placed in horizontal position as shown in Figure 2 in solid lines or it may be swung up out of the way as shown in dotted lines in this figure. This table is held in its horizontal position by means of set screws 82 bearing on the extended ledge of the carriage. Adjacent the backstop rods 75 is a gage 83. When the machine is being used as an underfeed stacker the gage will be fixed a given distance above the table 81 to indicate an approximate number of blanks in a stack that the operator might place on the table and under the gage. Then as the operator takes out successive piles from the vertical stacker he will place them on the table to see if they have approximately the same number of blanks in them as indicated by the position of the gage. It will be apparent that as the backstop carriage is moved further to the rear wider blanks may be stacked in front of it.

The delivery belt 8 is mounted on a rear driving roller 84 and the shaft 85 carrying this roller is mounted in side frames 4 and 5 and also carries the arms 86 connected by the connecting shaft 87, the arms, shaft and its rollers forming the carrier 88 for the belt 8. The forward end of the arms of this carrier have thereon spaced guides 89 in which slide members 90 carry the roller 91 for the leading end of the delivery belt 8. This belt 8 is held tight by means of set screws 92 fitting in members 90 and bearing against the ends of arms 86. This leading end of carrier 88, with its roller 91 tilts vertically around shaft 85. On both sides the carrier 88 is held in its extended position at its receiving end by toggle arms 93 and 94, the upper end of arms 93 being pivoted to the end of the carrier and the lower end of arms 94 being fixed to torque shaft 95 passing through the frames of the machine and extending through frame 4 and having thereon handle 96. The toggle arms 93 and 94 have seats 97 and 98 which engage when the common pivots 99 of the two arms pass the line between the pivot points of the ends of the arms, thereby rigidly holding the carrier 88 in its horizontal position.

Figure 10:
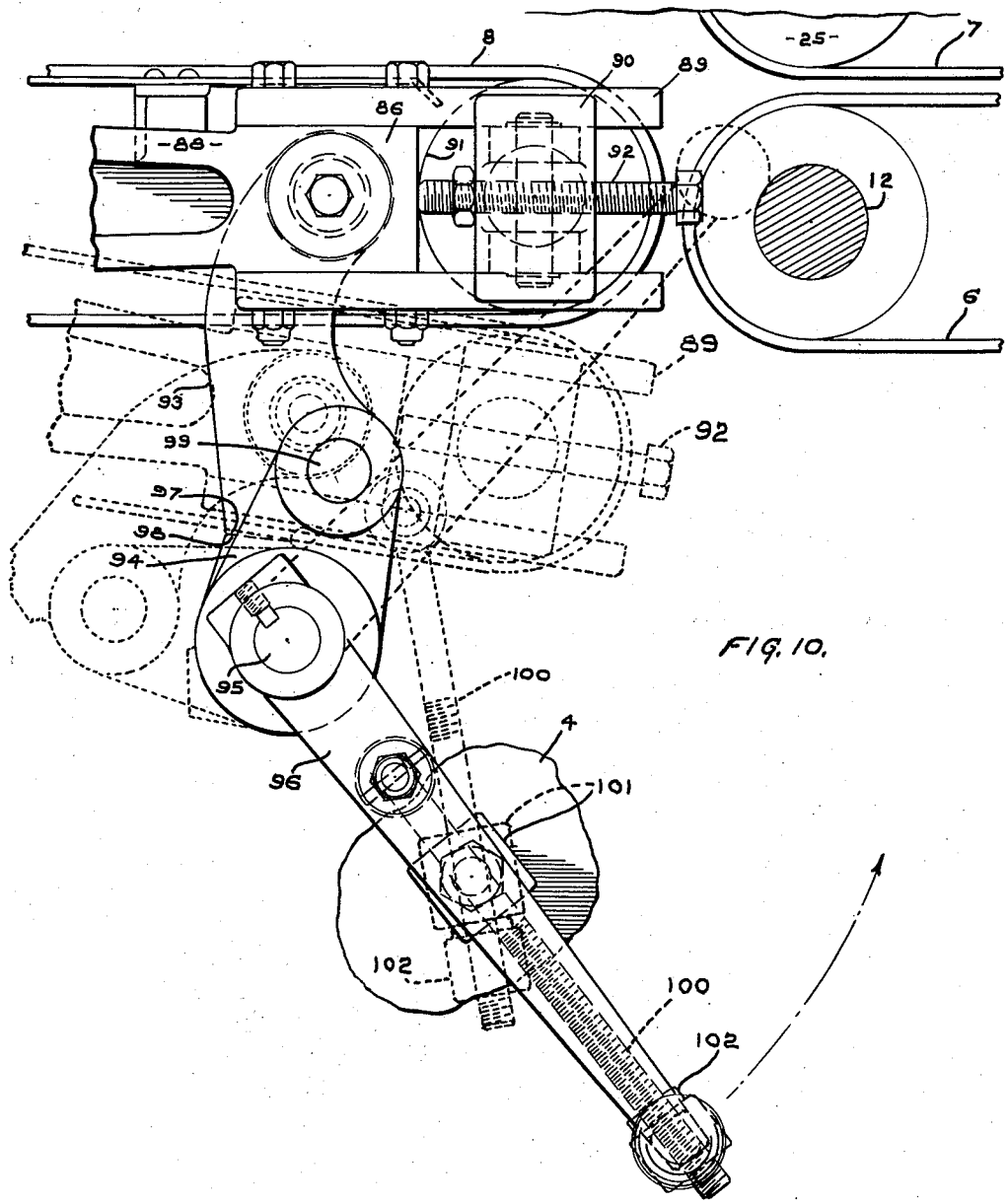
Figure 10 is a side elevation of the tilting lever mechanism from the operator's side for changing the slope of the delivery belt.

Handle 96 has pivoted thereon rod 100 which slides through a member 101 pivotally mounted on the side frame 4. This rod 100 has a nut 102 at its free end. When it is desired to lower the tilting end of the carrier 88 of the delivery belt 8 so that the belt may serve as a lap stacker, the handle 96 is turned upwardly as shown by the arrow in Figure 10. This movement breaks the toggle arms 93 and 94 so that they hinge to the rear and the end of the conveyor is lowered. The nut 102 limits the extent of that lowering by contact with member 101, this action being shown by the dotted lines in Figure 10.

When the delivery conveyor is lowered the back stop table 81 is raised and the deflector 103 is placed on the angle 104 of the backstop 60 as shown in Figure 16 and as the blanks issue from between the belts 6 and 7 they are deflected downwardly to the belt 8 and overlap thereon as shown in this figure. As the blanks are fed upwardly on the belt 8 they may be removed before they reach the end stop 105 at the pivotal end of this conveyor. This stop 105 will serve to stand the blanks up angularly on the delivery belt in a substantially continuous stack on the delivery belt.

Figure 7:
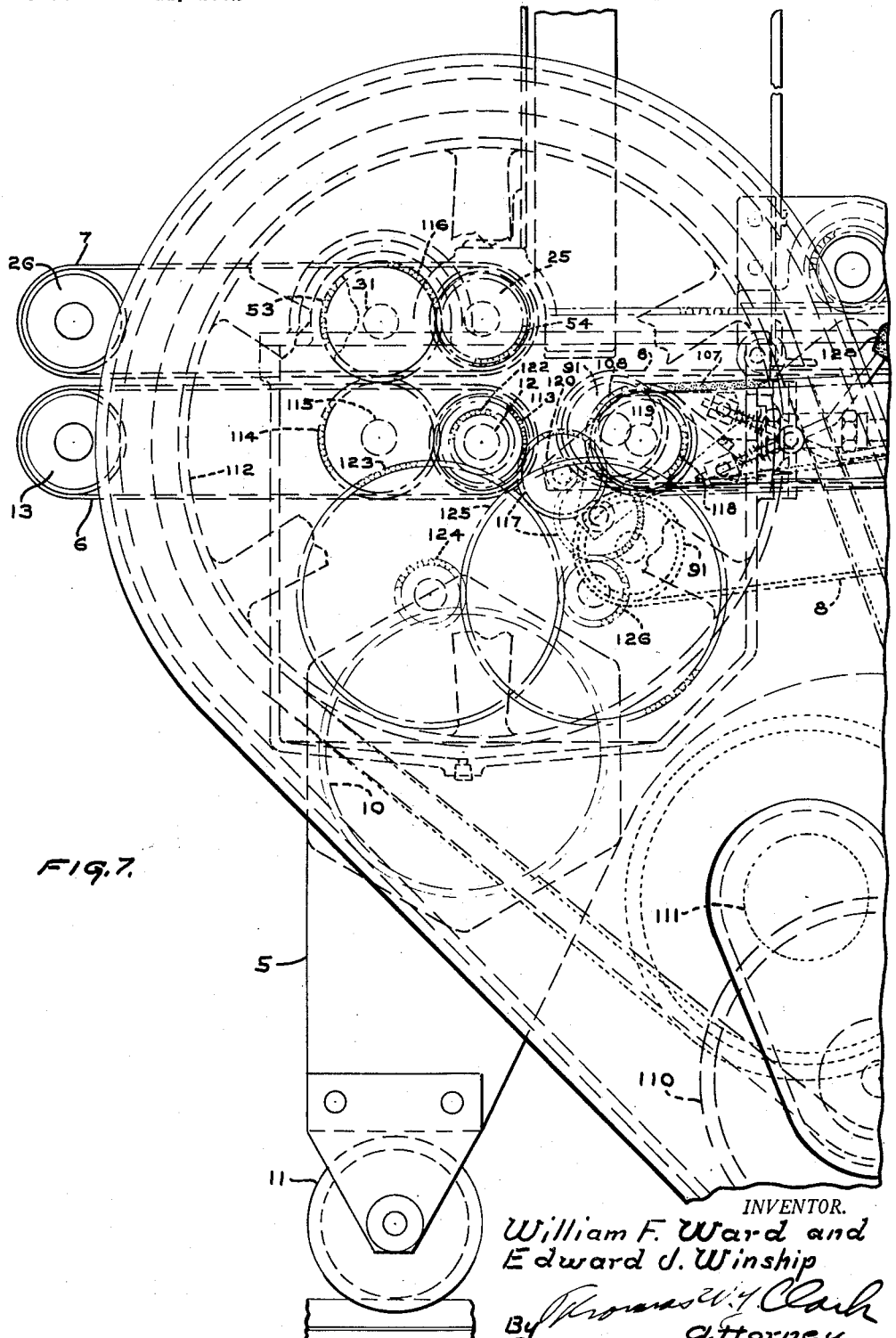
Figure 7 is a vertical view from the driving side of the machine showing the arrangement of the driving means.
Figure 9:
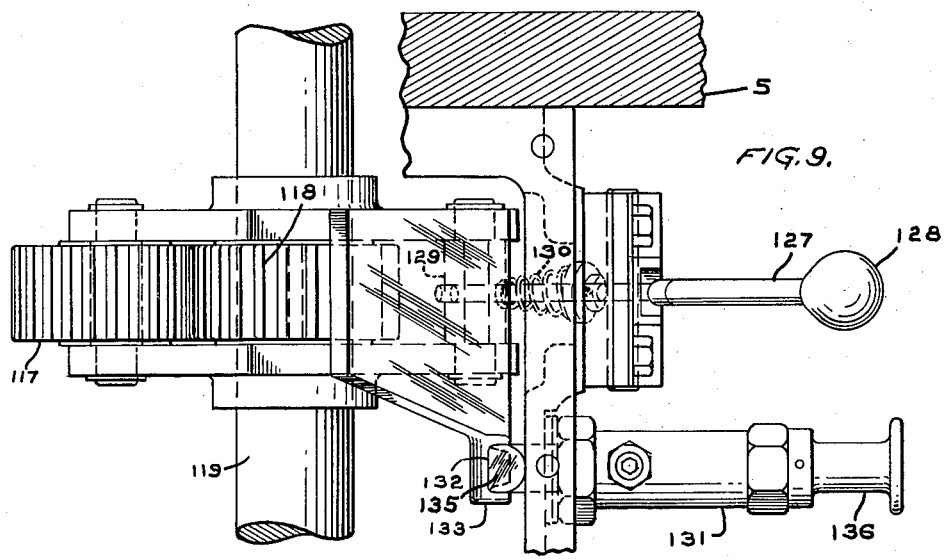
Figure 9 is a top plan view of the gear shift of Figure 8.

The delivery belt 8 is driven from a sprocket 106 on shaft 85 and sprocket chain 107 is in turn driven from sprocket wheel 108. The drive for the stacker is illustrated in Figure 7. A motor mounted on side frame 5 is driven in synchronism with the slotter. This motor through means of a Reeves drive 111 drives large pulley 112 mounted on shaft 12, and through means of the Reeves drive, shaft 12, driving lower feed belt 6, is given an equal speed to that of the slotter delivering blanks to the stacker. Shaft 12 having gear 113 thereon drives gear 114 on shaft 115. This gear 114 drives gear 116 on shaft 31. This shaft also carries gear 53 driving gear 54 to drive the upper belt 7 from its roller 25. Through this train of gearing the feed belts are kept in equal speed with the slotter delivery.

Figure 8:
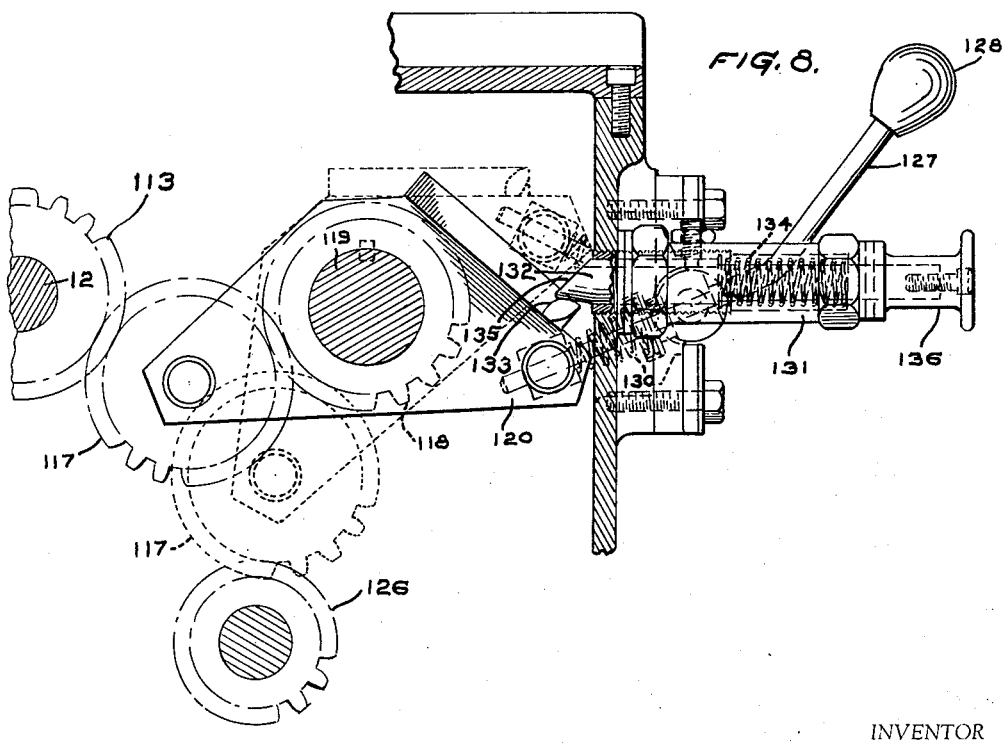
Figure 8 is a side elevation of the gear shift for changing the speed of the delivery belt.

The lower feed belt 6 is connected to the main drive shaft 12 and the gear 113 thereon drives gear 117 in bracket 120 when the bracket is in its upper position as shown in Figure 8. Gear 117 is in mesh with gear 118 on shaft 119 on which is sprocket wheel 108 which drives the sprocket chain 107 and which in turn drives the delivery belt 8.

When the speed change bracket 120 is in this upper position, the delivery belt 8 is driven at the same speed as the feed belts 6 and 7 and the delivery belt is horizontal and serves as a vertical stacker in combination with the backstop and side guides above described.

Shaft 12 also has thereon smaller gear 122 which meshes with large gear 123 on the shaft of which is a further small gear 124 meshing with a further large gear 125 on the shaft of which is a further small gear 126. When the speed change bracket 120 is lowered in its dotted line position as shown in Figures 7 and 8 gear 117 meshes with gear 126 and gives to gear 118 and sprocket 108 a very slow speed in comparison to that of the feed belts 6 and 7. This speed is desired when the delivery belt is in its lower position serving as a lap stacker. This belt may be so sloped and its speed so regulated in relation to that of the feed belts that the blanks will overlap thereon and stand in almost a vertical position as their forward ends are dropped to the preceding blank and the rear ends fall and are pushed upward by the delivery belt 8, as shown in Figure 16.

The speed change bracket 120 is turned to either one of its respective positions by means of gear shift lever 127 which has a knob 128 at its outer end and which fits in trunnion 129 at its lower end. This trunnion passes through the bracket 120 at its ends, this bracket holding the gears 117 and 118. The spring 130 tends to hold the bracket 120 in whichever position it is thrown by the lever 127. A gear shift lock 131 is also provided having a bolt 132 therein which fits over a catch 133 on the speed change bracket 120 and the bolt is held in extended position by spring 134. The bolt preferably has a sloping face 135 which will automatically retract the bolt when the speed change bracket is moved from its lower to its upper position but the bolt must be retracted by the handle 136 when the speed change bracket is changed to its upper position.

From the above it will be apparent that the stacker is changed from an underfeed stacker to a lap stacker simply by turning the handles 96 and 127, after releasing the lock 131. Also the adjustments for different size blanks are equally quickly made and the stacker will serve in its two capacities as is required most efficiently.

It will be apparent that many changes may be made in the particular construction of the parts without departing from the invention as described in the following claims.

What is claimed as new and is desired to be secured by Letters Patent is:

1. A combination underfeed and lap stacker for blanks comprising a first conveyor, a belt conveyor adjacent and in longitudinal alignment with the first conveyor, a rigid elongate frame having rollers in each end supporting said belt conveyor, said frame being pivoted at its conveyor delivery end for vertical swinging of the receiving end of the conveyor, a vertical blank stacker over the receiving end of said belt conveyor immediately adjacent its swinging end, means to adjust the elevation of said belt conveyor receiving end relatively to the first conveyor to locate the belt conveyor in an upper position in which the upper run of the belt conveyor receiving end is in a plane above the first conveyor to receive blanks horizontally from the first conveyor and to stack them in said vertical stacker, and to locate the belt conveyor in a lower position in which the upper run of the belt conveyor receiving end is in a plane below the first conveyor to receive blanks as they are dropped from the first conveyor to the belt conveyor, unitary drive means for both said conveyors and means to decrease the speed of the belt conveyor relatively to the speed of the first conveyor when the receiving end of the belt conveyor is lowered, to overlap the dropped blanks with each other.

2. A combination underfeed and lap stacker for blanks comprising a first conveyor for advancing blanks in spaced relation, a substantially horizontal belt conveyor for receiving blanks from said first conveyor, a rigid elongate frame having rollers in each end supporting said belt conveyor, said frame being pivoted at its conveyor delivery end for vertical swinging of the receiving end of the conveyor, unitary means to drive said conveyors at substantially the same speed, a stop adjacent the belt conveyor to receive the leading edge of the blanks, the stop being spaced from the receiving end of the belt conveyor a distance less than the dimension of the blanks fed in the direction of their movement, the plane of the upper run of the receiving end of the belt conveyor being above the blanks as they are delivered from the first conveyor and the receiving end of the belt conveyor being spaced from the trailing edge of the blanks as they are held by said stop whereby the blanks are stacked successively horizontally, each under its predecessor on the belt conveyor, means to lower the receiving end of the belt conveyor substantially below the blanks as they are delivered from the first conveyor and means to change the speed of the belt conveyor to drive it substantially slower than the first conveyor, whereby the blanks falling from the first conveyor overlap each other on the belt conveyor.

3. A combination underfeed and lap stacker for blanks comprising a first conveyor for advancing blanks in spaced relation, a substantially horizontal belt conveyor for receiving blanks from said first conveyor, a rigid elongate frame having rollers in each end supporting said belt conveyor, said frame being pivoted at its conveyor delivery end for vertical swinging of the receiving end of the conveyor, unitary means to drive said conveyors at substantially the same speed, a stop above and adjacent the belt conveyor receiving end to receive the leading edge of the blanks, the plane of the upper run of the receiving end of the belt conveyor being above the blanks as they are delivered from the first conveyor and the receiving end of the belt conveyor being spaced from the trailing edge of the blanks as they are held by said stop, whereby the blanks are stacked successively horizontally, each under its predecessor on the belt conveyor, levers supporting the receiving end of the belt conveyors on both sides and means to tilt said levers to lower the receiving end of the belt conveyor substantially below the blanks as they are delivered from the first conveyor and means to change the speed of the belt conveyor to drive it substantially slower than the first conveyor, whereby the blanks falling from the first conveyor overlap each other on the belt conveyor.

4. A combination underfeed and lap stacker for blanks comprising a first conveyor for advancing blanks, a belt conveyor aligned with the first conveyor for receiving blanks therefrom, rigid means to mount said belt conveyor to tilt about its rear end, unitary means to drive said conveyors at substantially the same speeds, tilting means to in one position place the plane of the upper run of the receiving end of the belt conveyor substantially horizontal and above the blanks as they are delivered thereto from the first conveyor and in a lower position to receive blanks from the first conveyor as they are dropped therefrom, a stop above and adjacent the receiving end of the belt conveyor when in its upper position to stop the leading edge of the blanks so that the trailing edges of the blanks overhang the receiving end of the belt conveyor, whereby the blanks are horizontally stacked on the belt conveyor, and means to decrease the relative speed of the belt conveyor, when tilted to the lower position, whereby the dropped blanks overlap each other.

5. A combination underfeed and lap stacker for blanks comprising a first conveyor for advancing blanks, a belt conveyor aligned with the first conveyor for receiving blanks therefrom, rigid means to mount said belt conveyor to tilt about its rear end, unitary means to drive said conveyors at substantially the same speeds, toggle levers supporting the belt conveyor at its free end, tilting means to operate the toggle levers to in an upper position place the plane of the upper run of the receiving end of the belt conveyor substantially horizontal and above the blanks as they are delivered thereto from the first conveyor and lock it there and in a lower position to place the receiving end of the belt conveyor in position to receive blanks from the first conveyor as they are dropped therefrom, a stop above and adjacent the belt conveyor receiving end when in its upper position to stop the leading edge of the blanks so that the trailing edges of the blanks overhang the receiving end of the belt conveyor, whereby the blanks are horizontally stacked on the belt conveyor, and means to decrease the relative speed of the belt conveyor, when tilted to the lower position, whereby the dropped blanks overlap each other.

6. A combination underfeed and lap stacker for blanks comprising a first conveyor for advancing blanks in spaced relation, a substantially horizontal belt conveyor for receiving blanks from said first conveyor, a rigid elongate frame having rollers in each end supporting said belt conveyor, said frame being pivoted at its conveyor delivery end for vertical swinging of the receiving end of the conveyor, coordinated means to drive said conveyors from a common source and at substantially the same speeds, a stop above and adjacent the belt conveyor receiving end to receive the leading edge of the blanks, the plane of the upper run of the receiving end of the belt conveyor being above the blanks as they are delivered from the first conveyor and the receiving end of the belt conveyor being spaced from the trailing edge of the blanks as they are held by said stop, whereby each succeeding blank is stacked under the preceding blank on the belt conveyor, means to support the belt conveyor horizontally, means to lower the receiving end of the belt conveyor substantially below the blanks as they are delivered by the first conveyor, said coordinated drive means including a two-speed gear bracket connected to the belt conveyor at its pivoted end, and means to adjust said belt conveyor and bracket to drive the two conveyors at the same speed in the upper, horizontal position of the belt conveyor, and to adjust said belt conveyor and bracket to change the speed of the belt conveyor to drive it substantially slower than the first conveyor in the other, lower position of the belt conveyor, whereby blanks falling from the first conveyor to the belt conveyor substantially overlap.

7. A combination underfeed and lap stacker for blanks comprising a feeding conveyor having upper and lower driven means for forcefully advancing blanks in spaced out relation, a substantially horizontal belt conveyor for receiving blanks from said feeding conveyor, a rigid elongate frame having rollers in each end supporting said belt conveyor, said frame being pivoted at its conveyor delivery end for vertical swinging of the receiving end of the conveyor, means to drive all said conveyors from a common source and at substantially the same speeds, a stop above and adjacent the belt conveyor receiving end to receive the leading edge of the blanks, the plane of the upper run of the receiving end of the belt conveyor being above the blanks as they are delivered from the feeding conveyor and the receiving end of the belt conveyor being spaced from the trailing edge of the blanks as they are held by said stop, whereby each succeeding blank is stacked under the preceding blank on the belt conveyor, means to support the belt conveyor horizontally, means to lower the receiving end of the belt conveyor substantially below the blanks as they are delivered by the feeding conveyor, means to change the speed of the belt conveyor to drive it substantially slower than the first conveyor, whereby blanks falling from the first conveyor to the belt conveyor substantially overlap, the belt conveyor being driven from its rear end.

8. A combination underfeed and lap stacker for blanks comprising a feeding conveyor having upper and lower belts for advancing blanks in spaced relation, a substantially horizontal belt conveyor for receiving blanks from said feeding conveyor, a rigid elongate frame having rollers in each end supporting said belt conveyor, said frame being pivoted at its conveyor delivery end for vertical swinging of the receiving end of the conveyor, coordinated means to drive said conveyors at substantially the same speed, a stop above and adjacent the belt conveyor receiving end to receive the leading edge of the blanks, the plane of the upper run of the receiving end of the belt conveyor being above the blanks as they are delivered from the feeding conveyor and the receiving end of the belt conveyor being spaced from the trailing edge of the blanks as they are held by said stop, whereby the blanks are stacked successively horizontally, each under its predecessor on the belt conveyor, means to lower the receiving end of the belt conveyor substantially below the blanks as they are delivered from the feeding conveyor and means to change the speed of the belt conveyor to drive it substantially slower than the feeding conveyor, whereby the blanks falling from the feeding conveyor overlap each other on the belt conveyor, and means to separate the belts of the feeding conveyor while maintaining the drive thereto to clean material from between them.

9. A combination underfeed and lap stacker for blanks comprising a feeding conveyor having upper and lower spaced belts for advancing blanks in spaced relation, a frame mounting one of said belts for vertical movement with respect to the other to adjust the distance therebetween, a substantially horizontal belt conveyor for receiving blanks from said feeding conveyor, coordinated means to drive said conveyors at substantially the same speed and at all positions of adjustment of said spaced belts, a stop above and adjacent the belt conveyor receiving end to receive the leading edge of the blanks, the plane of the upper run of the receiving end of the belt conveyor being above the blanks as they are delivered from the feeding conveyor and the receiving end of the belt conveyor being spaced from the trailing edge of the blanks as they are held by said stop, whereby the blanks are stacked successively horizontally, each under its predecessor on the belt conveyor, means to lower the receiving end of the belt conveyor substantially below the blanks as they are delivered from the feeding conveyor and means to change the speed of the belt conveyor to drive it substantially slower than the feeding conveyor, whereby the blanks falling from the feeding conveyor overlap each other on the belt conveyor and means to separate the belts of the feeding conveyor while maintaining the drive thereto to clean material from between them.

10. A combination underfeed and lap stacker for blanks comprising a feeding conveyor having upper and lower spaced belts for advancing blanks in spaced relation, a frame mounting one of said belts for vertical movement with respect to the other to adjust the distance therebetween, means connected to the frame to move the frame to separate the belts substantially and reversely to lock the frame in its original spaced position relative to the other conveyor, a substantially horizontal belt conveyor for receiving blanks from said feeding conveyor, coordinated means to drive said conveyors at substantially the same speed and at all positions of adjustment and separation of said spaced belts, a stop above and adjacent the belt conveyor receiving end to receive the leading edge of the blanks, the plane of the upper run of the receiving end of the belt conveyor being above the blanks as they are delivered from the feeding conveyor and the receiving end of the belt conveyor being spaced from the trailing edge of the blanks as they are held by said stop, whereby the blanks are stacked successively horizontally, each under its predecessor on the belt conveyor, means to lower the receiving end of the belt conveyor substantially below the blanks as they are delivered from the feeding conveyor and means to change the speed of the belt conveyor to drive it substantially slower than the feeding conveyor, whereby the blanks falling from the first conveyor overlap each other on the belt conveyor.

11. A combination underfeed and lap stacker for blanks comprising a first conveyor for advancing blanks in spaced relation, a substantially horizontal two speed belt conveyor for receiving blanks from said first conveyor, a rigid elongate frame having rollers in each end supporting said belt conveyor, said frame being pivoted at its conveyor delivery end for vertical swinging of the receiving end of the conveyor, a stop above and adjacent the belt conveyor receiving end to receive the leading edge of the blanks, the plane of the upper run of the receiving end of the belt conveyor being above the blanks as they are delivered from the first conveyor and the receiving end of the belt conveyor being spaced from the trailing edge of the blanks as they are held by said stop, whereby the blanks are stacked successively horizontally each under its predecessor on the belt conveyor, means to lower the receiving end of the belt conveyor substantially below the blanks as they are delivered from the first conveyor, two sets of gears to drive the belt conveyor at its respective speeds, a constantly driven gear, a bracket mounting the constantly driven gear, and means to move the bracket to place the constantly driven gear into operation with either of said two sets of gears, one set of gears driving the belt conveyor at substantially the speed of the first conveyor when the belt conveyor is horizontal, the other set of gears driving the belt conveyor substantially slower than the first conveyor when the belt conveyor is lowered, whereby the blanks falling from the first conveyor overlap each other on the belt conveyor.

References Cited in the file of this patent
UNITED STATES PATENTS

| | | |
|---|---|---|
| 1,203,878 | Huson | Nov. 7, 1916 |
| 1,868,384 | Greenwood | July 19, 1932 |
| 2,072,318 | Staude | Mar. 2, 1937 |
| 2,133,727 | Staude | Oct. 18, 1938 |
| 2,603,484 | Gates | July 15, 1952 |